US012726135B2

(12) United States Patent
Rossi et al.

(10) Patent No.: US 12,726,135 B2
(45) Date of Patent: Sep. 1, 2026

(54) MULTI-LEVEL POWER CONVERTER WITH FLYBACK CAPACITOR PRE-CHARGE

(71) Applicant: Infineon Technologies Austria AG, Villach (AT)

(72) Inventors: Alex Rossi, Villach (AT); Matteo-Alessandro Kutschak, Ludmannsdorf (AT); David Meneses Herrera, Helsinki (FI)

(73) Assignee: Infineon Technologies Austria AG, Villach (AT)

( * ) Notice: Subject to any disclaimer, the term of this patent is extended or adjusted under 35 U.S.C. 154(b) by 174 days.

(21) Appl. No.: 18/771,097

(22) Filed: Jul. 12, 2024

(65) Prior Publication Data

US 2026/0019008 A1 Jan. 15, 2026

(51) Int. Cl.

| | |
|---|---|
| ***H02M 1/00*** | (2007.01) |
| ***H02M 1/42*** | (2007.01) |
| ***H02M 7/483*** | (2007.01) |
| ***H02M 7/537*** | (2006.01) |

(52) U.S. Cl.

CPC ....... *H02M 7/4837* (2021.05); *H02M 1/0045* (2021.05); *H02M 7/4835* (2021.05); *H02M 7/537* (2013.01); *H02M 1/4208* (2013.01)

(58) Field of Classification Search

CPC ... H02M 3/1584–1586; H02M 1/0095; H02M 1/0085; H02M 1/4205; H02M 3/10043; H02M 7/4837; H02M 7/4835; H02M 7/537; H02M 7/125

See application file for complete search history.

(56) References Cited

U.S. PATENT DOCUMENTS

| | | | | |
|---|---|---|---|---|
| 10,027,223 | B1 * | 7/2018 | Zhang | H02M 3/07 |
| 10,536,073 | B2 * | 1/2020 | Young | H02M 7/10 |
| 11,581,796 | B2 * | 2/2023 | Yan | H02M 1/0025 |
| 2020/0044578 | A1 * | 2/2020 | Mangudi | H02M 3/158 |
| 2021/0083585 | A1 * | 3/2021 | Jiang | H02M 3/158 |

(Continued)

FOREIGN PATENT DOCUMENTS

WO WO-2021134492 A1 * 7/2021 ............. H02M 1/34

OTHER PUBLICATIONS

Samantha Coday, et al., "A Lightweight Multilevel Power Converter for Electric Aircraft Drivetrain", https://escholarship.org/uc/item/5x9056kh, Oct. 14, 2021.

(Continued)

*Primary Examiner* — Sisay G Tiku

(74) *Attorney, Agent, or Firm* — Cooper Legal Group LLC

(57) ABSTRACT

According to some embodiments, a multi-level power converter, includes an output terminal, a reference terminal, an inductor, a flying capacitor, a first switching stage including a first switch connected to the output terminal and connected to the flying capacitor at a first node, and a second switch connected to the flying capacitor at a second node and connected to the reference terminal, a second switching stage including a third switch connected to the first node and the inductor, and a fourth switch connected to the inductor and the second node, and a pre-charge unit connected to the flying capacitor and the output terminal and configured to pre-charge the flying capacitor based on a voltage at the output terminal during a start-up cycle of the multi-level power converter.

20 Claims, 7 Drawing Sheets

(56) References Cited

U.S. PATENT DOCUMENTS

| | | | | |
|---|---|---|---|---|
| 2021/0203223 | A1* | 7/2021 | Chang | H02M 3/073 |
| 2023/0020108 | A1 | 1/2023 | Wang et al. | |
| 2023/0291306 | A1* | 9/2023 | Young | H02M 1/36 |
| 2024/0250609 | A1* | 7/2024 | Concklin | H02M 1/36 |

OTHER PUBLICATIONS

Panteleimon Papamanolis, et al., "Behavior of the Flying Capacitor Converter Under Critical Operating Conditions", https://doi.org/10.3929/ethz-b-000187514, 2017.

K. Fernandez, et al., "A Bidirectional Liquid-Cooled GaN-based AC/DC Flying Capacitor Multi-Level Converter with Integrated Startup and Additively Manufactured Cold-Plate for Electric Vehicle Charging", IEEE Applied Power Electronics Conference and Exposition (APEC), Houston, TX, USA, Mar. 2022.

Rytis Beinarys, et al., "Hybrid Voltage Balancing Control in 3-level Bridgeless Totem-pole PFC", IEEE Applied Power Electronics Conference and Exposition (APEC), 2021.

* cited by examiner

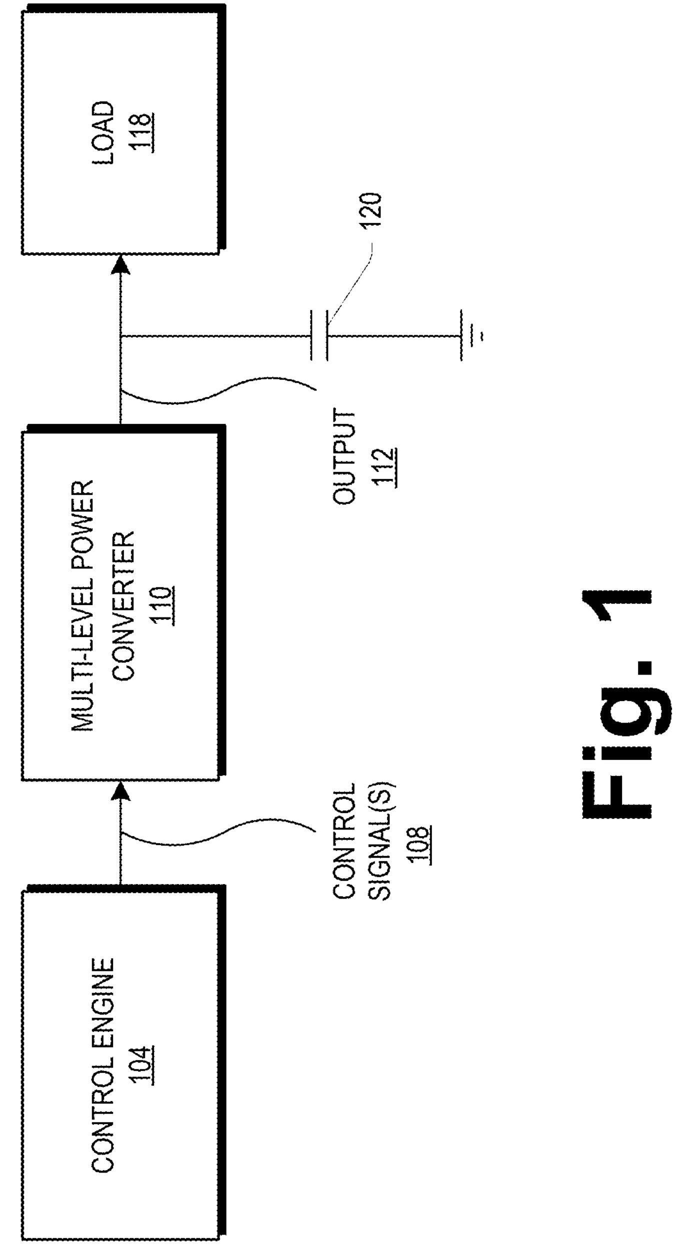
Fig. 1

110
112
$V_{BULK}$
112R
323
223
OPTOCOUPLER 330
OPTOCOUPLER 230
324A
324B
224A
224B
326
328
226
228
$V_S$
$V_{REF2}$
$V_{REF}$
$V_{FC2}$
$V_{FC}$
$V_{FC-}$
$V_C$
300
200
CONTROL ENGINE 104
204C
204A
204B
208C
208A
208B
208D
206A
206B
206C
212
210
217A
217B
NTC 220
222
218
214
216A
216B

VBULK
120
112
112R
LINEAR REGULATOR 232
BIAS CONVERTER 234
VS
238
CONTROL ENGINE 104
223
VS
OPTOCOUPLER 230
VS
VC
228
VREF
VS
226
VFC
VFC-
200
212
224A
224B
204A
208A
204B
210
206B
208B
206A
217A
217B
NTC 220
222
218
216A
216B
221
214
423
VS
OPTOCOUPLER 430
VS
428
VREF
VS
426
VFC
400
412
424A
424B
404A
408A
404B
410
406B
408B
406A
401
110

MULTI-LEVEL POWER CONVERTER WITH FLYBACK CAPACITOR PRE-CHARGE

TECHNICAL FIELD

The present disclosure relates to the field of regulated power conversion.

BACKGROUND

Various types of devices may utilize electric power converters that convert one form of electric energy to another, such as by changing a voltage of the electric energy. A bidirectional power converter can operate as an AC/DC converter to function as power factor correction (PFC) unit or as a DC/AC converter to function as an inverter.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a multi-level power converter, comprises an output terminal, a reference terminal, an inductor, a flying capacitor, a first switching stage comprising a first switch connected to the output terminal and connected to the flying capacitor at a first node, and a second switch connected to the flying capacitor at a second node and connected to the reference terminal, a second switching stage comprising a third switch connected to the first node and the inductor, and a fourth switch connected to the inductor and the second node, and a pre-charge unit connected to the flying capacitor and the output terminal and configured to pre-charge the flying capacitor based on a voltage at the output terminal during a start-up cycle of the multi-level power converter.

According to some embodiments, a multi-level power converter comprises an output terminal, a reference terminal, an inductor, a flying capacitor, a first switching stage comprising a first switch connected to the output terminal and connected to the flying capacitor at a first node, a second switch connected to the flying capacitor at a second node and connected to the reference terminal, a second switching stage comprising a third switch connected to the first node and the inductor, and a fourth switch connected to the inductor and the second node, a charging circuit connected to the flying capacitor and the output terminal, a sensing amplifier connected to the first node and the second node to sense a flying capacitor voltage of the flying capacitor, and a comparator configured to generate a disable signal to disable the charging circuit responsive to the flying capacitor voltage being at least a predetermined fraction of a voltage at the output terminal.

According to some embodiments, a method for controlling a multi-level power converter comprises connecting a first switching stage to an output terminal and a flying capacitor, connecting a second switching stage to an inductor and the first switching stage, generating a supply voltage from a voltage at the output terminal, and controlling a charging circuit to pre-charge the flying capacitor using the supply voltage during a start-up cycle of the multi-level power converter.

According to some embodiments, a system for controlling a multi-level power converter comprises means for connecting a first switching stage to an output terminal and a flying capacitor, means for connecting a second switching stage to an inductor and the first switching stage, means for generating a supply voltage from a voltage at the output terminal, and means for controlling a charging circuit to pre-charge the flying capacitor using the supply voltage during a start-up cycle of the multi-level power converter.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 1 a diagram of a power converter apparatus, in accordance with some embodiments.

DETAILED DESCRIPTION

Figure 2:
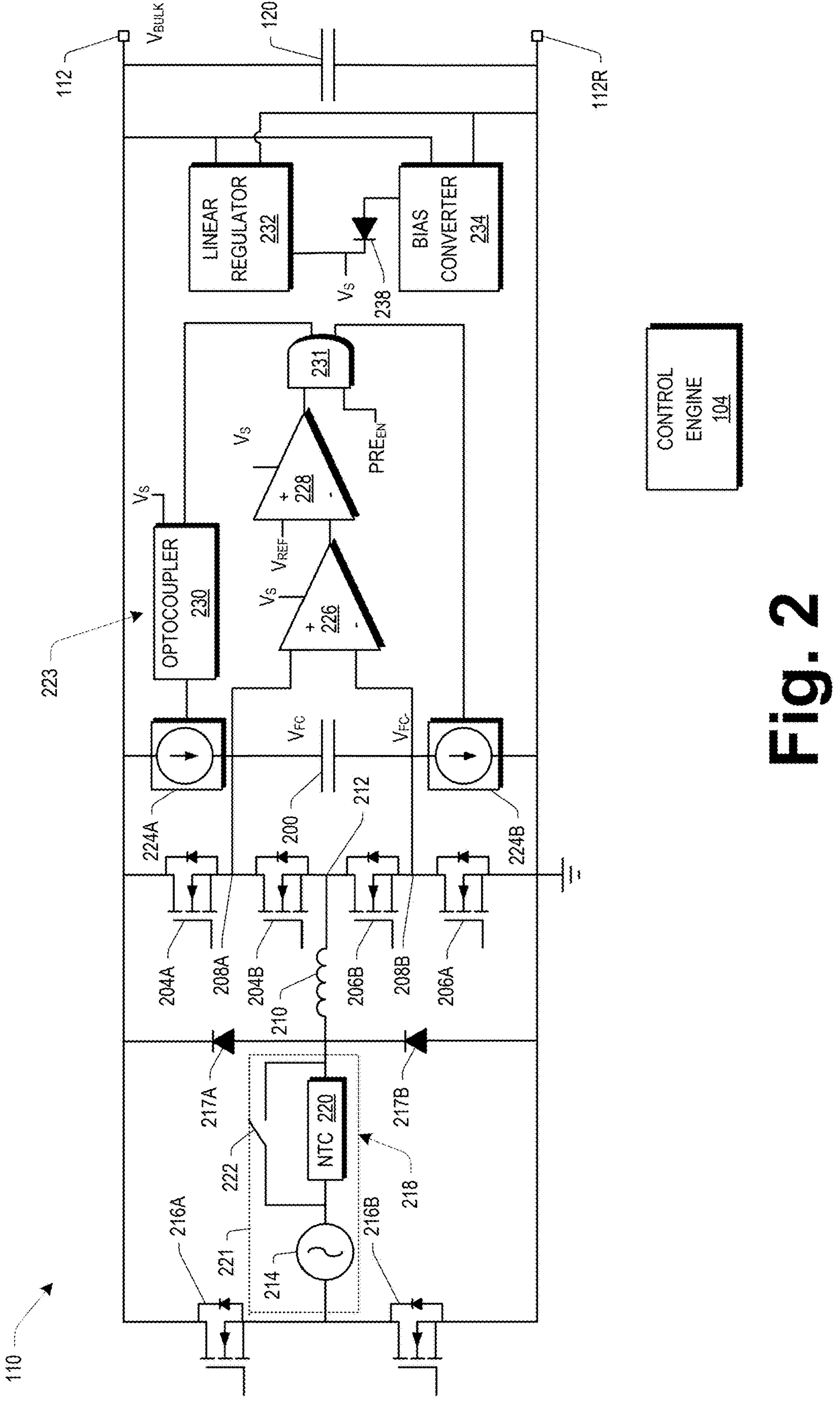
FIG. 2 is a diagram of a multi-level power converter, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

The term "power converter" and/or the like as used herein broadly refers to any type of power converter or voltage regulator (VR) that provides one or more regulated voltages to one or more electronic loads such as an Ethernet switch, an Ethernet router, an ASIC (application-specification integrated circuit), a memory device, a processor such as a central processing unit (CPU), a microprocessor, a graphics processing unit (GPU), a digital signal processor (DSP), an artificial intelligence (AI) accelerator, an image processor, a network or packet processor, a coprocessor, a multi-core processor, a front-end processor, a baseband processor, a field programmable gate array (FPGA), a lighting element, a power tool, a vehicle, a motor, or some other suitable load. For example, the power converter may be a buck converter, a boost converter, a buck-boost converter, a switched capacitor voltage regulator, a step-down converter, a two inductor, two capacitor (CLLC) converter, a resonant converter, etc. The power converter may be implemented as a power converter apparatus.

The term "power converter apparatus" and/or the like as used herein means a functional assembly, such as a packaged functional assembly or a combination of one or more printed circuit boards and/or discrete components, that includes a regulated power converter including a switching circuit used in converting a voltage from one level to another level, e.g., as in power conversion, power factor correction, and voltage regulation. The power converter apparatus may also include a driver circuit for driving the switching circuit. The power converter apparatus may additionally include a control engine for controlling the driver circuit so as to implement the power converter. The control engine may be configured to control the regulated power converter to reduce a voltage error of the output voltage, such as a difference between the output voltage and a target voltage, to control a current error of the output current, such as a difference between the output current and a target current, to provide power factor correction, or some other power conversion function.

The regulated power converter may supply power, to a DC load, at an output of the regulated power converter in a grid connected embodiment (i.e., AC/DC conversion). Alternatively, the regulated power converter may act as an inverter to convert a DC power supply to generate an AC signal to power an AC load (i.e. DC/AC conversion). The control engine and/or driver functionality may instead be implemented outside the power converter apparatus. The driver circuit for the switching circuit included in the power converter apparatus also may be outside the power converter apparatus. Various passive components such as capacitors and/or inductors that make up the power converter may be included in the power converter apparatus, surface mounted to the power converter apparatus, located on a separate board, etc. Described next in more detail are various embodiments of the power converter apparatus, a method of controlling the power converter apparatus, and an electronic system that includes the power converter apparatus.

A multi-level power converter is a type of power converter that provides high efficiency and small size compared to other topologies. The multi-level power converter has N number of levels, such as 3 or more levels.

A multi-level power converter comprises 2(N−1) switches and (N−2) interconnected flying capacitors. The 2(N−1) switches are broken down into (N−1) switching groups. Each group has two switches which are driven in a complementary fashion, but each group is $$\frac{2\pi}{N-1}$$

out of phase from the previous group. For example, in a multi-level power converter having three levels, the converter has one flying capacitor and two switching groups. The switching groups are driven 180° out of phase. The switches in the same switching group are driven using complementary signals.

Referring to FIG. 1 a diagram of a power converter apparatus 100 is provided, in accordance with some embodiments. The power converter apparatus 100 comprises a control engine 104 and a multi-level power converter 110. The control engine 104 is configured to control the multi-level power converter 110 using one or more control signals 108. The control engine 104 can control the multi-level power converter 110 for PFC operation (AC-DC) or inverter operation (DC-AC) for both grid-connected and stand-alone applications. In some embodiments, the multi-level power converter 110 controls and/or regulates an output voltage and/or an output current at an output terminal 112 of the multi-level power converter 110. The power converter apparatus 100 may comprise a voltage regulator configured to control the output voltage at the output to match a target voltage and/or the power converter apparatus 100 may be configured to reduce a voltage error of the output voltage. The voltage error may correspond to a difference between the output voltage and the target voltage. In some embodiments, the output terminal 112 is connected to a capacitor 120 for smoothing the output voltage. The output voltage may correspond to a voltage of the capacitor 120. The output terminal 112 may be connected to a load 118 to which the multi-level power converter 110 supplies power, for example. In another application, the capacitor 120 may represent a DC supply, such as a battery, and the multi-level power converter 110 may operate as an inverter to convert the DC voltage to an AC voltage for powering an AC load.

Referring to FIG. 2, a diagram of the multi-level power converter 110 is provided, in accordance with some embodiments. It may be appreciated that the multi-level power converter 110 may comprise any number of levels, such as 3 or more levels. In the embodiment of FIG. 2, the multi-level power converter 110 comprises N=3 levels. In some embodiments, the multi-level power converter 110 comprises a flying capacitor 200 (N−2 flying capacitors) and switching groups indexed by letter (N−1 switching groups). The switching group A comprises switches 204A, 206A and the switching group B comprises switches 204B, 206B (2(N−1)) switches per switching group). The switch 204A is connected to the output terminal 112 and the switch 206A is connected to a reference terminal 112R (e.g., ground). The flying capacitor 200 is connected to a node 208A between the switches 204A, 204B and a node 208B between the switches 206A, 206B. An inductor 210 is connected to a node 212 between the switches 204B, 206B.

In some embodiments, the multi-level power converter 110 is configured in a grid-connected embodiment with the AC grid being represented by an AC source 214. Buck switches 216A, 216B and diodes 217A, 217B facilitate operating the multi-level power converter 110 in a buck converter mode to regulate the output voltage ($V_{BULK}$) at the output terminal 112. A protection circuit 218 comprising a negative temperature coefficient (NTC) resistor 220 and a relay 222 may be provided to limit inrush current during a cold start of the multi-level power converter 110. The relay 222 may be closed after the start cycle to bypass the NTC resistor 220. In a grid connected PFC mode, the multi-level power converter 110 may be operated to convert voltage at the output terminal 112 to an AC signal provided back the AC source 214.

In a standalone embodiment, a load 221 (represented by a dashed box) may be connected in place of the AC source 214 and the protection circuit 218, and the multi-level power converter 110 may operate in an inverter mode to power the load by converting the DC voltage on the capacitor 120 to generate an AC supply for the load 221.

In an embodiment where the multi-level power converter 110 operates as a DC/DC regulator to generate a DC supply for the load 221, the transistor 216A and the diode 217B may be omitted and the transistor 216B may be kept on (i.e., shorted) during operation. Power could be provided from the output terminal 112 to the load 221 or from the load 221 to the output terminal 112.

In some embodiments, the switches 204A, 206A in the switching group A are driven by the control engine 104 in a complementary fashion. The switches 204B, 206B in the switching group B are also driven by the control engine 104 in a complementary fashion, but out of phase from the switching group A according to the relationship:

$$\frac{2\pi}{N-1}.$$

The control engine 104 generates control signals to operate the switching groups A, B to convert the input voltage at the AC source 214 to generate the output voltage ($V_{BULK}$). For example, the gate of the switch 204A in the switching group A is operated by a gate signal based on a pulse width modulation signal (PWM) and the gate of the switch 206A in the switching group A is operated with a second gate signal that is a complementary version of the first gate signal. The gate signals for the switches 204B, 206B in the switching group B are also complimentary PWM signals that are out of phase with those of the switching group A.

For balanced operation the voltage at the flying capacitor 200 should be a predetermined fraction of the output voltage ($V_{BULK}$) at the output terminal 112. For example, for a three level converter, the predetermined fraction is one half. This ratio reduces ripple in the output voltage and balance the voltages blocked by the switches 204A, 206A, 204B, 206B. The switches 206A, 204B block the flying capacitor voltage ($V_{FC}$) and the switches 204A, 206A block the voltage difference between the output voltage and the flying capacitor voltage ($V_{FC}$). During a cold startup, the flying capacitor 200 is not charged, potentially causing increased stress on the switches 204A, 206A.

To inhibit startup stress, the flying capacitor 200 is charged by a pre-charge unit 223 comprising charging circuits 224A, 224B, a sensing amplifier 226, a comparator 228, and an optocoupler 230. In some embodiments, one of the charging circuits 224A, 224B is omitted. The sensing amplifier 226 senses the flying capacitor voltage ($V_{FC}$). The comparator 228 compares the sensed flying capacitor voltage ($V_{FC}$) to a threshold ($V_{REF}$) set at a value representing a predetermined fraction of the output voltage ($V_{BULK}$), such as one half for a three level converter. An disable signal output ($V_C$) of the comparator 228 is connected to the charging circuit 224A by the optocoupler 230 to provide voltage domain isolation and the disable signal output ($V_C$) is directly connected to the charging circuit 224B in a low voltage domain. Responsive to the flying capacitor voltage ($V_{FC}$) being less than $V_{REF}$ the comparator 228 enables the charging circuits 224A, 224B to charge the flying capacitor 200. When the threshold voltage set by $V_{REF}$ is met, the comparator 228 disables the charging circuits 224A, 224B.

In some embodiments, the comparator 228 employs hysteresis to allow the charging circuits 224A, 224B if the flying capacitor voltage ($V_{FC}$) drops below a second threshold. In some embodiments, the control engine 104 may disable the comparator 228 during steady-state operation, for example, using a logic gate 231 that receives a pre-charge enable signal ($PRE_{EN}$) from the control engine 104 and the output of the comparator 228 and masks the output of the comparator 228 when the pre-charge enable signal is not asserted. In some embodiments, the charging circuits 224A, 224B are implemented using current sources, however, other types of charging circuits 224A, 224B may be used.

During a cold start a linear regulator 232 in the pre-charge unit 223 provides a supply voltage ($V_s$) for the sensing amplifier 226, the comparator 228, and the optocoupler 230 while the flying capacitor 200 is being charged. After the output voltage ($V_{BULK}$) is developed, a bias converter 234 generates the supply voltage ($V_s$). The output of the bias converter 234 is connected to a diode 238. When the bias converter 234 activates after sufficient voltage is present at the output terminal 112, the linear regulator 232 deactivates automatically.

Figure 3:
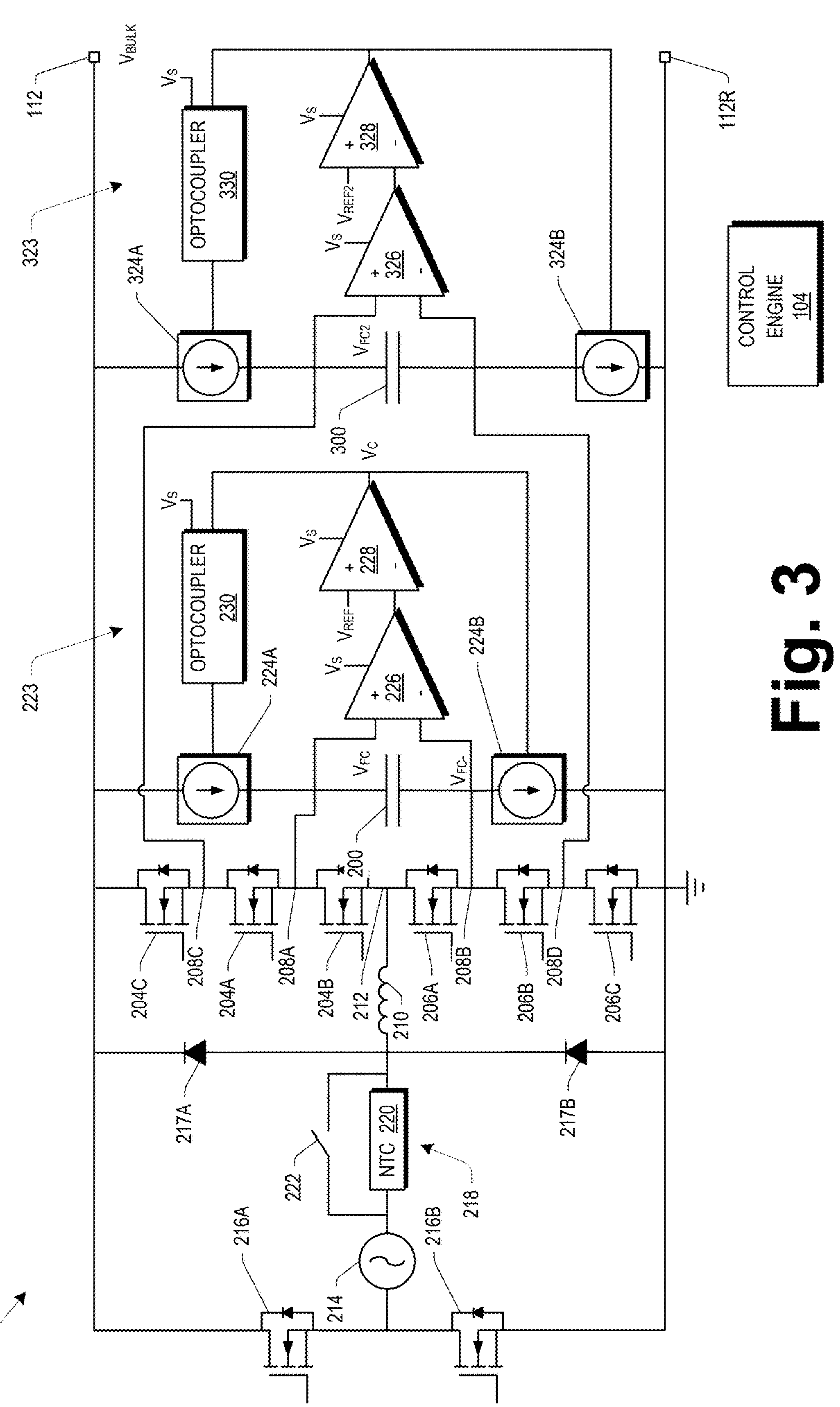
FIG. 3 is a diagram of a multi-level power converter configured with four levels, in accordance with some embodiments.

Referring to FIG. 3, a diagram of the multi-level power converter 110 configured with N=4 levels is provided, in accordance with some embodiments. For ease of illustration, the linear regulator 232, the bias converter 234, the capacitor 120 are not illustrated in FIG. 3. The multi-level power converter 110 comprises an additional switching group C including switches 204C, 206C and a flying capacitor 300 connected to a node 208C between the switches 204A, 204C and a node 208D between the switches 206B, 206C.

An additional pre-charge unit 323 is provided to pre-charge the flying capacitor 300 during startup. The pre-charge unit 323 comprises at least one of a charging circuit 324A or a charging circuit 324B, a sensing amplifier 326, a comparator 328, and an optocoupler 330. In some embodiments, one of the charging circuits 324A, 324B is omitted. The sensing amplifier 326 senses the flying capacitor voltage ($V_{FC2}$). The comparator 328 compares the sensed flying capacitor voltage ($V_{FC2}$) to a threshold ($V_{REF2}$) set a value representing a predetermined fraction of the output voltage ($V_{BULK}$). For the four level embodiment of FIG. 3, the predetermined fractions used to set $V_{REF}$ and $V_{REF2}$ are one third and two thirds, respectively. The comparator 328 is connected to the charging circuit 324A by the optocoupler 330 to provide voltage domain isolation. Responsive to the flying capacitor voltage ($V_{FC2}$) being less than $V_{REF2}$ the comparator 328 enables the charging circuits 324A, 324B to charge the flying capacitor 300. When the threshold voltage set by $V_{REF}$ is met, the comparator 328 disables the charging circuits 324A, 324B. In some embodiments, the comparator 328 employs hysteresis to allow the charging circuits 324A, 324B if the flying capacitor voltage ($V_{FC2}$) drops below a second threshold. In some embodiments, the control engine 104 may disable the comparator 328 during steady-state operation, for example, using a logic gate that receives a pre-charge enable signal from the control engine 104 and the output of the comparator 328 and masks the output of the comparator 228 when the pre-charge enable signal is not asserted. In some embodiments, the charging circuits 324A, 324B are implemented using current sources.

In some embodiments, logic gates similar to the logic gate 231 in FIG. 2 may be connected to the comparators 228, 328 and controlled by the control engine to disable pre-charging.

The arrangement illustrated in FIG. 3 may be expanded to provide any number of levels in the multilevel power converter 110. N−1 pre-charge units 223, 323 are provided, one for each flying capacitor 200, 300.

Figure 4:
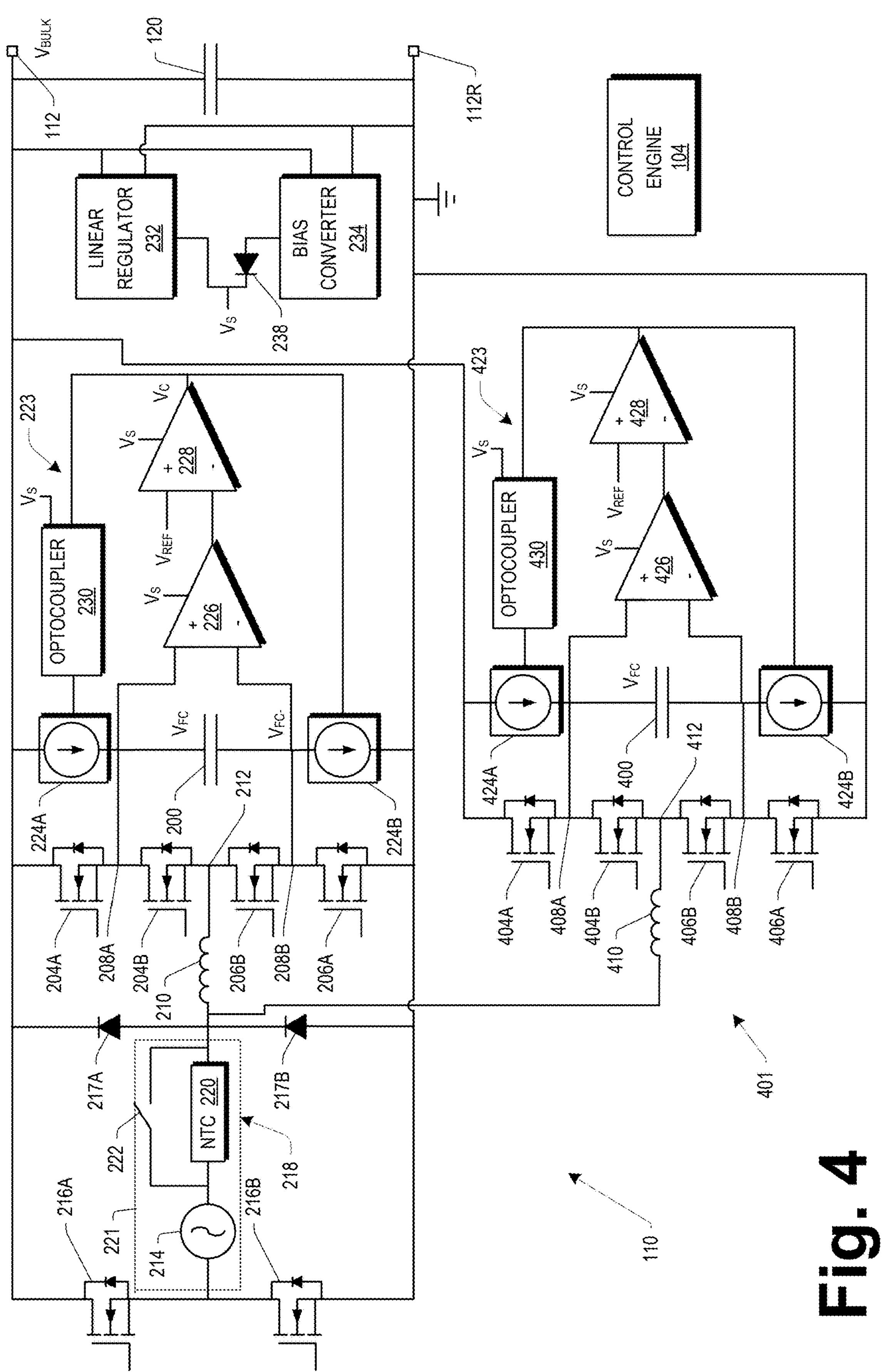
FIG. 4 is a diagram of a multi-level power converter configured with interleaved stages, in accordance with some embodiments.

Referring to FIG. 4, a diagram of the multi-level power converter 110 in an interleaved arrangement, in accordance with some embodiments. The multi-level power converter 110 is a 2-times interleaved, 3-level converter. In some embodiments, the multi-level power converter 110 comprises a flying capacitor 400 switching groups C and D to define a second stage 401. The flying capacitor 200 and the switching groups A and B define a first stage 201. The stages 201, 401 are controlled in a non-overlapping phase relationship. The switching group C comprises switches 404A, 406A and the switching group D comprises switches 404B, 406B. The switch 404A is connected to the output terminal 112 and the switch 406A is connected to a reference terminal 112R (e.g., ground). The flying capacitor 400 is connected to a node 408A between the switches 404A, 404B and a node 408B between the switches 406A, 406B. An inductor 410 is connected to a node 412 between the switches 404B, 406B.

To inhibit startup stress, the flying capacitor 400 is charged by a pre-charge unit 423 comprising at least one of a charging circuit 424A or a charging circuit 424B, a sensing amplifier 426, a comparator 428, and an optocoupler 430. In some embodiments, one of the charging circuits 424A, 424B is omitted. The sensing amplifier 426 senses the flying capacitor voltage ($V_{FC}$). The comparator 428 compares the sensed flying capacitor voltage ($V_{FC2}$) to a threshold ($V_{REF}$) set a value representing a predetermined fraction of the output voltage ($V_{BULK}$), such as one half for a three level converter. The comparator 428 is connected to the charging circuit 424A by the optocoupler 430 to provide voltage domain isolation. Responsive to the flying capacitor voltage ($V_{FC}$) being less than $V_{REF}$ the comparator 428 enables the charging circuits 424A, 424B to charge the flying capacitor 400. When the threshold voltage set by $V_{REF}$ is met, the comparator 428 disables the charging circuits 424A, 424B. In some embodiments, the comparator 428 employs hysteresis to allow the charging circuits 424A, 424B if the flying capacitor voltage ($V_{FC}$) drops below a second threshold. In some embodiments, the control engine 104 may disable the comparator 428 during steady-state operation, for example, using a logic gate that receives a pre-charge enable signal from the control engine 104 and the output of the comparator 428 and masks the output of the comparator 428 when the pre-charge enable signal is not asserted. In some embodiments, the charging circuits 424A, 424B are implemented using current sources, however, other types of charging circuits 424A, 424B may be used.

In some embodiments, logic gates similar to the logic gate 231 in FIG. 2 may be connected to the comparators 228, 428 and controlled by the control engine to disable pre-charging.

The arrangement illustrated in FIGS. 3 and 4 may be combined and expanded to provide any number of levels or any number of interleaved stages in the multilevel power converter 110.

Figure 5:
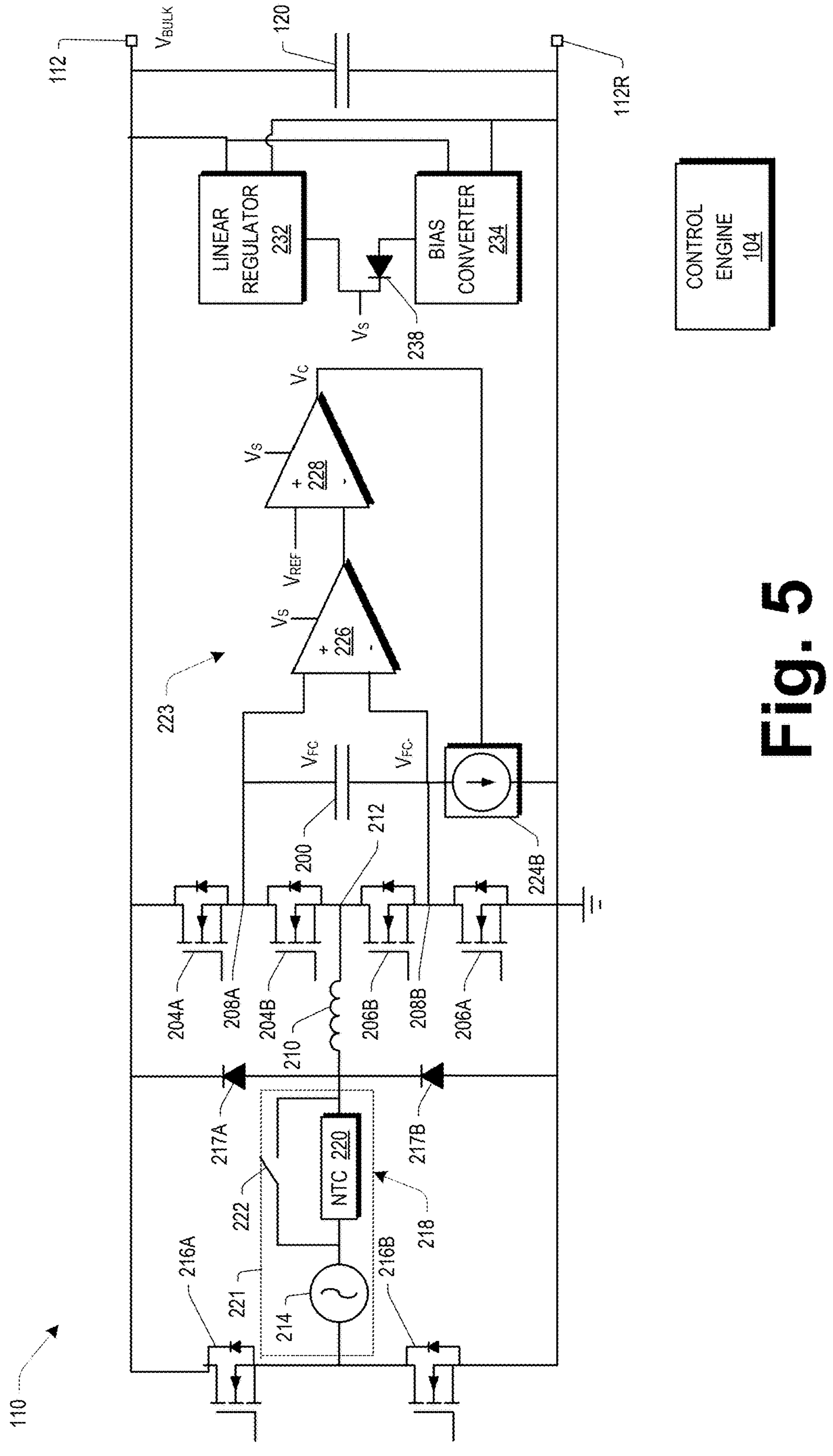
FIG. 5 is a diagram of a multi-level power converter configured for power factor control, in accordance with some embodiments.

Referring to FIG. 5, a diagram of the multi-level power converter 110 in a PFC only arrangement, in accordance with some embodiments. In the PFC only embodiment, the charging circuit 224A and the optocoupler 230 are omitted and the flying capacitor 200 is pre-charged using only the charging circuit 224B.

Figure 7:
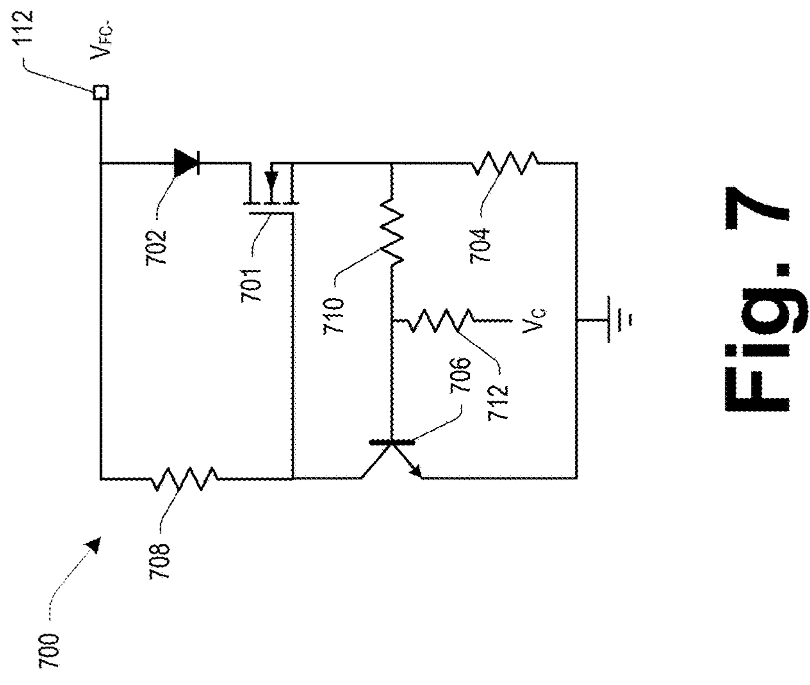
FIGS. 6 and 7 are diagrams of charging circuits, in accordance with some embodiments
Figure 6:
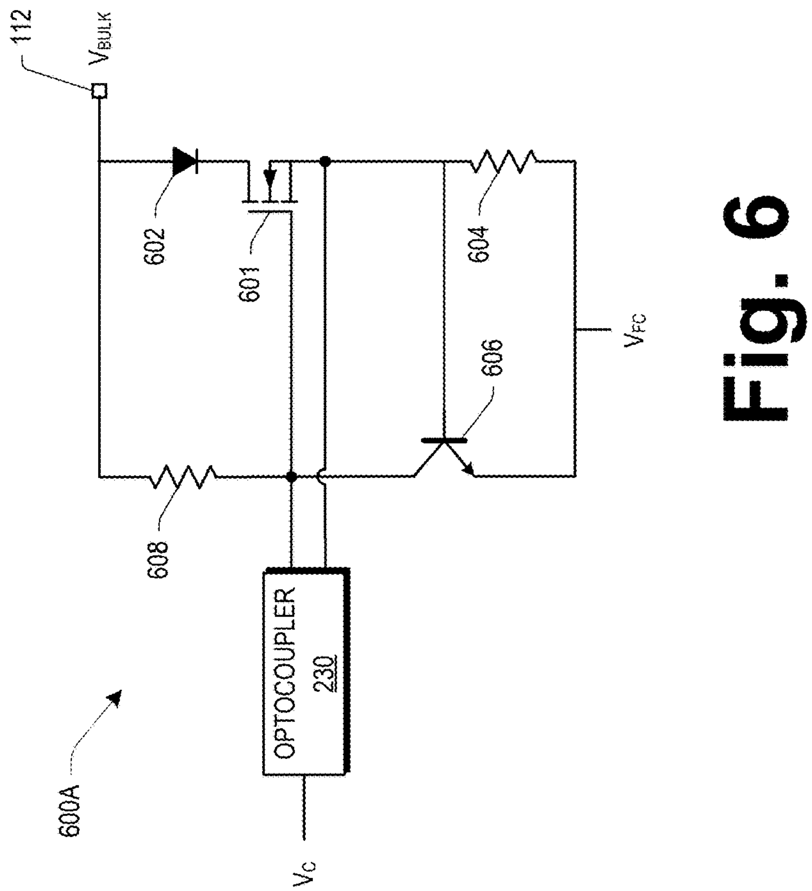

Referring to FIGS. 6 and 7, diagrams of charging circuits 600, 700 are provided, in accordance with some embodiments. One or more of the charging circuits 224A, 324A, 424A referenced to the flying capacitor voltage ($V_{FC}$) may be implemented using the charging circuit 600 and one or more of the charging circuits 224B, 324B, 424B referenced to ground may be implemented using the charging circuit 700. In some embodiments, the charging circuits 600, 700 comprise current sources.

The charging circuit 600 comprises a transistor 601 connected to the output terminal 112 through a diode 602 and connected to ground through a resistor 604. A bipolar transistor 606 is connected to the output terminal 112 through a resistor 608. The optocoupler 230 activates the transistor 601 to enable the charging circuit 600A and deactivates the transistor 601 to disable the charging circuit 600A.

The transistor 601 operates in the linear region and provides the current path to charge the flying capacitor 200. The diode 602 is in anti-series with the drain of the transistor 601 to inhibit source to drain current. The bipolar transistor 606 provides feedback to the transistor 601. The current level is controlled by the resistor 604 connected to the source of the transistor 601 according to:

$$Rs \cdot I\max = V_{BEsat}.$$

The charging circuit 700 comprises a transistor 701 connected to the node 208B ($V_{FC-}$) in FIG. 2 through a diode 702 and connected to ground through a resistor 704. A bipolar transistor 706 is connected to the output terminal 112 through a resistor 708. A resistor 710 is connected between the base of the bipolar transistor 706 and the source of the transistor 701. The disable signal ($V_C$) is applied to the base of the bipolar transistor 706 through a resistor 712. The transistor 701 operates in the linear region and provides the current path to charge the flying capacitor 200. The diode 702 is in anti-series with the drain of the transistor 701 to inhibit source to drain current.

Figure 8:
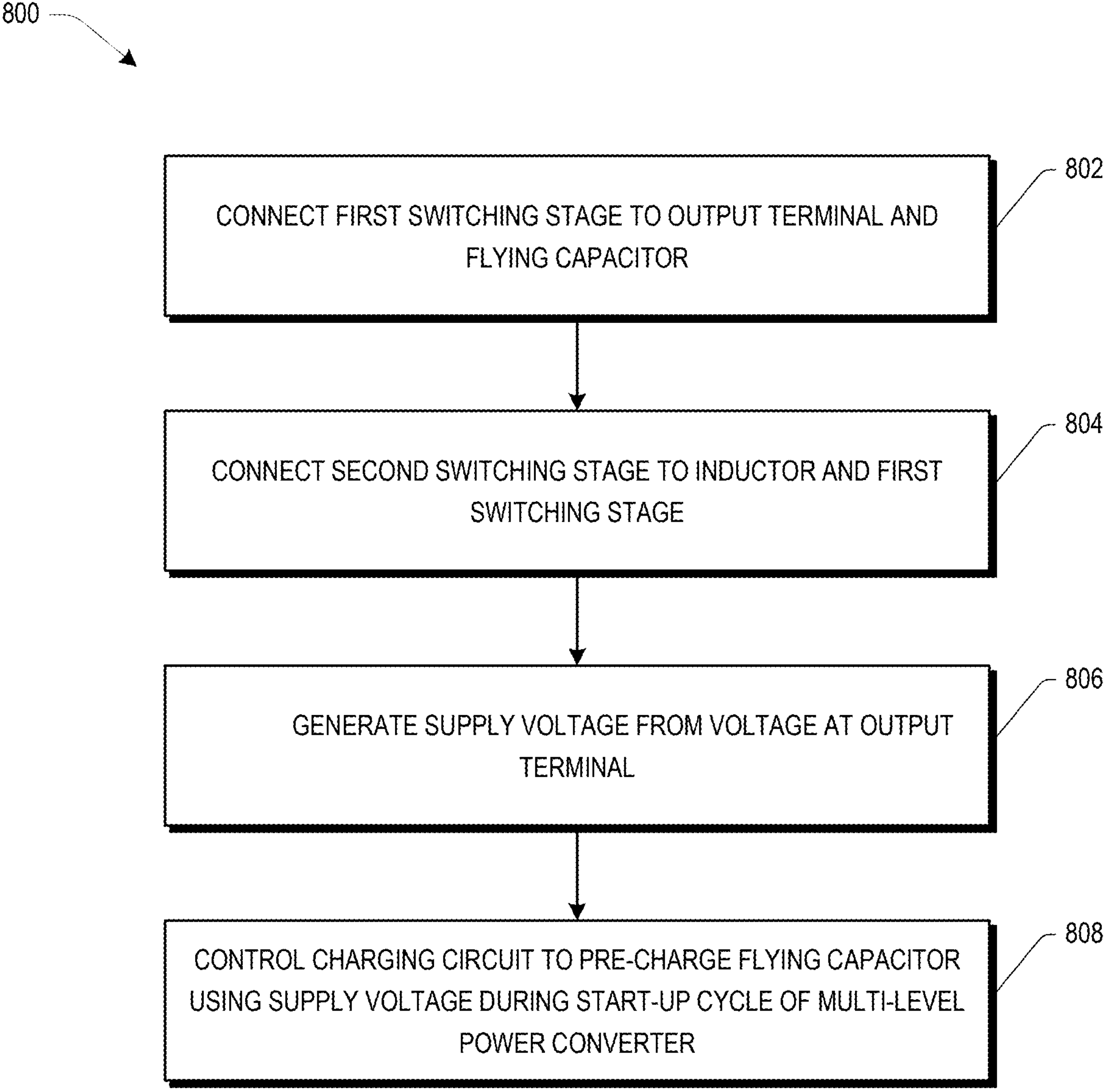
FIG. 8 illustrates a method for controlling a multi-level power converter, in accordance with some embodiments.

FIG. 8 illustrates a method 800 for controlling a multi-level power converter 110, in accordance with some embodiments. At 802, a first switching stage is connected to an output terminal 112 and a flying capacitor 200. At 804, a second switching stage is connected to an inductor 210 and the first switching stage. At 806, a supply voltage is generated from a voltage at the output terminal 112. At 808; a charging circuit 224A, 224B is controlled to pre-charge the flying capacitor 200 using the supply voltage during a start-up cycle of the multi-level power converter 110.

According to some embodiments, a multi-level power converter, comprises an output terminal, a reference terminal, an inductor, a flying capacitor, a first switching stage comprising a first switch connected to the output terminal and connected to the flying capacitor at a first node, and a second switch connected to the flying capacitor at a second node and connected to the reference terminal, a second switching stage comprising a third switch connected to the first node and the inductor, and a fourth switch connected to the inductor and the second node, and a pre-charge unit connected to the flying capacitor and the output terminal and configured to pre-charge the flying capacitor based on a voltage at the output terminal during a start-up cycle of the multi-level power converter.

According to some embodiments, the pre-charge unit comprises a first charging circuit connected to the first node, a second charging circuit connected to the second node, a sensing amplifier connected to the first node and the second node to sense a flying capacitor voltage of the flying capacitor, and a comparator configured to generate a disable signal to disable the first charging circuit and the second charging circuit based on the flying capacitor voltage.

According to some embodiments, the comparator is configured to assert the disable signal responsive to the flying capacitor voltage being at least a predetermined fraction of the voltage at the output terminal.

According to some embodiments, the pre-charge unit comprises an optocoupler connected between the comparator and the first charging circuit.

According to some embodiments, at least one of the first charging circuit or the second charging circuit comprises a current source.

According to some embodiments, the pre-charge unit comprises a charging circuit connected to the second node, a sensing amplifier connected to the first node and the second node to sense a flying capacitor voltage of the flying capacitor, and a comparator configured to generate a disable signal for the charging circuit based on the flying capacitor voltage.

According to some embodiments, the multi-level power converter comprises a third switching stage comprising a fifth switch connected to the first switch at a third node and connected to the output terminal, and a sixth switch connected to the second switch at a fourth node and connected to the reference terminal, a second flying capacitor connected to the third node and the fourth node, and a second pre-charge unit connected to the second flying capacitor and the output terminal and configured to pre-charge the second flying capacitor based on the voltage at the output terminal during the start-up cycle of the multi-level power converter.

According to some embodiments, the multi-level power converter comprises a second inductor connected to the inductor, a second flying capacitor, a third switching stage comprising a fifth first switch connected to the output terminal and connected to the second flying capacitor at a third node, a sixth switch connected to the second flying capacitor at a fourth node and connected to the reference terminal, a fourth switching stage comprising a seventh switch connected to the third node and the second inductor, and an eighth switch connected to the second inductor and the fourth node, and a second pre-charge unit connected to the second flying capacitor and the output terminal and configured to pre-charge the second flying capacitor based on the voltage at the output terminal during the start-up cycle of the multi-level power converter.

According to some embodiments, the pre-charge unit comprises a linear regulator connected to the output terminal and configured to power the pre-charge unit during the start-up cycle of the multi-level power converter.

According to some embodiments, a multi-level power converter comprises an output terminal, a reference terminal, an inductor, a flying capacitor, a first switching stage comprising a first switch connected to the output terminal and connected to the flying capacitor at a first node, a second switch connected to the flying capacitor at a second node and connected to the reference terminal, a second switching stage comprising a third switch connected to the first node and the inductor, and a fourth switch connected to the inductor and the second node, a charging circuit connected to the flying capacitor and the output terminal, a sensing amplifier connected to the first node and the second node to sense a flying capacitor voltage of the flying capacitor, and a comparator configured to generate a disable signal to disable the charging circuit responsive to the flying capacitor voltage being at least a predetermined fraction of a voltage at the output terminal.

According to some embodiments, the charging circuit comprises a current source.

According to some embodiments, the multi-level power converter comprises a linear regulator connected to the output terminal and configured to power the sensing amplifier and the comparator during a start-up cycle of the multi-level power converter.

According to some embodiments, the multi-level power converter comprises a bias regulator connected to the output terminal and configured to power the sensing amplifier and the comparator after the start-up cycle.

According to some embodiments, a method for controlling a multi-level power converter comprises connecting a first switching stage to an output terminal and a flying capacitor, connecting a second switching stage to an inductor and the first switching stage, generating a supply voltage from a voltage at the output terminal, and controlling a charging circuit to pre-charge the flying capacitor using the supply voltage during a start-up cycle of the multi-level power converter.

According to some embodiments, generating the supply voltage comprises generating the supply voltage using a linear regulator.

According to some embodiments, controlling the charging circuit comprises sensing a flying capacitor voltage of the flying capacitor, and generating a disable signal for the charging circuit based on the flying capacitor voltage.

According to some embodiments, the method comprises asserting the disable signal responsive to the flying capacitor voltage being at least a predetermined fraction of the voltage at the output terminal.

According to some embodiments, the method comprises providing the disable signal to an optocoupler connected to the charging circuit.

According to some embodiments, the controlling the charging circuit comprises controlling a current source to pre-charge the flying capacitor.

According to some embodiments, the method comprises providing a second flying capacitor associated with one of an additional level of the multi-level power converter or an additional stage of the multi-level power converter, and controlling a second charging circuit to pre-charge the second flying capacitor using the supply voltage during the start-up cycle of the multi-level power converter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an “example” is not necessarily to be construed as advantageous over other aspects or designs. Rather, use of the word “example” is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term “or” is intended to mean an inclusive “or” rather than an exclusive “or”. That is, unless specified otherwise, or clear from context, “X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A multi-level power converter, comprising:
- an output terminal;
- a reference terminal;
- an inductor;
- a flying capacitor;
- a first switching stage comprising:
  - a first switch connected to the output terminal and connected to the flying capacitor at a first node; and
  - a second switch connected to the flying capacitor at a second node and connected to the reference terminal;
- a second switching stage comprising:
  - a third switch connected to the first node and the inductor; and
  - a fourth switch connected to the inductor and the second node; and
  - a pre-charge unit connected to the flying capacitor and the output terminal and configured to pre-charge the flying capacitor based on a voltage at the output terminal during a start-up cycle of the multi-level power converter, wherein the pre-charge unit comprises:
  - a first charging circuit connected to the first node;
  - a second charging circuit connected to the second node;
  - a sensing amplifier connected to the first node and the second node to sense a flying capacitor voltage of the flying capacitor; and
  - a comparator configured to generate a disable signal to disable the first charging circuit and the second charging circuit based on the flying capacitor voltage.

2. The multi-level power converter of claim 1, wherein:
- the comparator is configured to assert the disable signal responsive to the flying capacitor voltage being at least a predetermined fraction of the voltage at the output terminal.

3. The multi-level power converter of claim 1, wherein:
- the pre-charge unit comprises:
  - an optocoupler connected between the comparator and the first charging circuit.

4. The multi-level power converter of claim 1, wherein:
- at least one of the first charging circuit or the second charging circuit comprises a current source.

5. The multi-level power converter of claim 1, comprising:
- a third switching stage comprising:
  - a fifth switch connected to the first switch at a third node and connected to the output terminal; and
  - a sixth switch connected to the second switch at a fourth node and connected to the reference terminal;
- a second flying capacitor connected to the third node and the fourth node; and
- a second pre-charge unit connected to the second flying capacitor and the output terminal and configured to pre-charge the second flying capacitor based on the voltage at the output terminal during the start-up cycle of the multi-level power converter.

6. The multi-level power converter of claim 1, comprising:
- a second inductor connected to the inductor;
- a second flying capacitor;
- a third switching stage comprising:
  - a fifth switch connected to the output terminal and connected to the second flying capacitor at a third node;
  - a sixth switch connected to the second flying capacitor at a fourth node and connected to the reference terminal;
- a fourth switching stage comprising:
  - a seventh switch connected to the third node and the second inductor; and
  - an eighth switch connected to the second inductor and the fourth node; and
- a second pre-charge unit connected to the second flying capacitor and the output terminal and configured to pre-charge the second flying capacitor based on the voltage at the output terminal during the start-up cycle of the multi-level power converter.

7. The multi-level power converter of claim 6, wherein the second pre-charge unit comprises:
- a third charging circuit connected to the third node;
- a second sensing amplifier connected to the third node and the fourth node to sense a second flying capacitor voltage of the second flying capacitor; and
- a second comparator configured to generate a second disable signal for the third charging circuit based on the second flying capacitor voltage.

8. The multi-level power converter of claim 1, wherein:
- the pre-charge unit comprises:
  - a linear regulator connected to the output terminal and configured to power the pre-charge unit during the start-up cycle of the multi-level power converter.

9. A multi-level power converter, comprising:
- an output terminal;

a reference terminal;
an inductor;
a flying capacitor;
a first switching stage comprising:
a first switch connected to the output terminal and connected to the flying capacitor at a first node;
a second switch connected to the flying capacitor at a second node and connected to the reference terminal;
a second switching stage comprising:
a third switch connected to the first node and the inductor; and
a fourth switch connected to the inductor and the second node;
a charging circuit connected to the flying capacitor and the output terminal;
a sensing amplifier connected to the first node and the second node to sense a flying capacitor voltage of the flying capacitor;
a comparator configured to generate a disable signal to disable the charging circuit responsive to the flying capacitor voltage being at least a predetermined fraction of a voltage at the output terminal; and
a linear regulator connected to the output terminal and configured to power the sensing amplifier and the comparator during a start-up cycle of the multi-level power converter.

10. The multi-level power converter of claim 9, wherein:
the charging circuit comprises a current source.

11. The multi-level power converter of claim 9, comprising:
a bias regulator connected to the output terminal and configured to power the sensing amplifier and the comparator after the start-up cycle.

12. The multi-level power converter of claim 9, comprising:
a second charging circuit connected to the second node, wherein:
the charging circuit is connected to the first node; and
the comparator is configured to generate the disable signal to disable the charging circuit and the second charging circuit based on the flying capacitor voltage.

13. The multi-level power converter of claim 9, comprising:
a second inductor connected to the inductor;
a second flying capacitor;
a third switching stage comprising:
a fifth switch connected to the output terminal and connected to the second flying capacitor at a third node;
a sixth switch connected to the second flying capacitor at a fourth node and connected to the reference terminal;
a fourth switching stage comprising:
a seventh switch connected to the third node and the second inductor; and
an eighth switch connected to the second inductor and the fourth node; and
a pre-charge unit connected to the second flying capacitor and the output terminal and configured to pre-charge the second flying capacitor based on the voltage at the output terminal during the start-up cycle of the multi-level power converter.

14. The multi-level power converter of claim 9, comprising:
an optocoupler connected between the comparator and the charging circuit.

15. A method for controlling a multi-level power converter, comprising:
connecting a first switching stage to an output terminal and a flying capacitor;
connecting a second switching stage to an inductor and the first switching stage;
generating a supply voltage from a voltage at the output terminal;
controlling a charging circuit to pre-charge the flying capacitor using the supply voltage during a start-up cycle of the multi-level power converter;
providing a second flying capacitor associated with one of an additional level of the multi-level power converter or an additional stage of the multi-level power converter; and
controlling a second charging circuit to pre-charge the second flying capacitor using the supply voltage during the start-up cycle of the multi-level power converter.

16. The method of claim 15, wherein:
generating the supply voltage comprises:
generating the supply voltage using a linear regulator.

17. The method of claim 15, wherein:
controlling the charging circuit comprises:
sensing a flying capacitor voltage of the flying capacitor; and
generating a disable signal for the charging circuit based on the flying capacitor voltage.

18. The method of claim 17, comprising:
asserting the disable signal responsive to the flying capacitor voltage being at least a predetermined fraction of the voltage at the output terminal.

19. The method of claim 17, comprising:
providing the disable signal to an optocoupler connected to the charging circuit.

20. The method of claim 15, wherein:
controlling the charging circuit comprises:
controlling a current source to pre-charge the flying capacitor.

* * * * *